United States Patent
Honda et al.

(10) Patent No.: US 9,735,593 B2
(45) Date of Patent: Aug. 15, 2017

(54) BATTERY SYSTEM

(71) Applicant: Hitachi, Ltd., Tokyo (JP)

(72) Inventors: Mitsutoshi Honda, Tokyo (JP); Takeshi Inoue, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 14/684,818

(22) Filed: Apr. 13, 2015

(65) Prior Publication Data

US 2015/0295432 A1    Oct. 15, 2015

(30) Foreign Application Priority Data

Apr. 14, 2014 (JP) ................................ 2014-082439

(51) Int. Cl.
*H02J 7/00*    (2006.01)
*H01M 10/42*    (2006.01)

(52) U.S. Cl.
CPC ....... *H02J 7/0021* (2013.01); *H01M 10/4207* (2013.01)

(58) Field of Classification Search
CPC ...... H02J 7/0021; H02J 7/0024; H02J 7/0029; H02J 7/0047; H02J 7/0049; H02J 2007/005; H02J 2007/0055; H02J 7/0063; H02J 7/007; H02J 7/0073; H02J 7/0075; H01M 10/44; H01M 10/441
USPC .......................... 320/101, 126, 127, 130, 132
See application file for complete search history.

(56) References Cited

U.S. PATENT DOCUMENTS

| | | | | |
|---|---|---|---|---|
| 5,744,936 A | * | 4/1998 | Kawakami | H01M 10/4207 320/120 |
| 7,939,190 B2 | * | 5/2011 | Colello | G01R 31/3658 429/149 |
| 8,330,301 B2 | * | 12/2012 | Demetriades | H02J 3/36 307/150 |
| 8,928,174 B2 | * | 1/2015 | Muto | B60L 11/1855 307/71 |
| 9,276,422 B2 | * | 3/2016 | Hotta | H01M 10/425 |
| 9,362,771 B2 | * | 6/2016 | Weissenborn | H02J 7/0024 |
| 9,373,970 B2 | * | 6/2016 | Feuerstack | B60L 11/18 |
| 2011/0140649 A1 | * | 6/2011 | Choi | H01M 14/005 320/101 |

(Continued)

FOREIGN PATENT DOCUMENTS

JP    6-283210 A    10/1994

*Primary Examiner* — Richard Isla Rodas
*Assistant Examiner* — Michael DiBenedetto
(74) *Attorney, Agent, or Firm* — Mattingly & Malur, PC (57) ABSTRACT

A battery system includes a plurality of battery packs connected in parallel each including a switch and a battery connected to the switch in series and a battery state determining unit determining a state of the battery. The battery state determining unit includes a disconnection determining unit controlling disconnection of the switch and a switch controller controlling open and close of the switch in accordance with a result of determining the state. The disconnection determining unit calculates allowable stop and demanded stop periods of the battery packs on the basis of the past data, season data, and allowable currents of the batteries and transmits data to the switch controller when the demanded stop period is smaller than the allowable stop period, and the switch controller makes the switch in an open state.

4 Claims, 13 Drawing Sheets

(56) References Cited

U.S. PATENT DOCUMENTS

| | | | |
|---|---|---|---|
| 2012/0194139 A1* | 8/2012 | Sasaki | H01M 10/0525 320/126 |
| 2013/0285612 A1* | 10/2013 | Okuda | H02J 7/0016 320/126 |

\* cited by examiner

PRIOR ART

| Allowable stop period / Demanded stop period | 0~A | A~1 | More than one |
|---|---|---|---|
| Controlling | Continue operation without stop | Stop operation of battery pack to reduce SOC error | Stop operation of the battery pack and re-estimate SOC |

BATTERY SYSTEM

CROSS REFERENCE TO RELATED APPLICATION

This application claims the foreign priority benefit under Title 35, United States Code, §119(a)-(d) of Japanese Patent Application No. 2014-082439, filed on Apr. 14, 2014 in the Japan Patent Office, the disclosure of which is herein incorporated by reference in its entirety.

BACKGROUND OF THE INVENTION

1. Field of the Invention

The present invention relates to a battery system including a battery pack group, each including battery packs connected in parallel.

2. Description of the Related Art

Recently, a power generation technology using natural energy (renewable energy) such as wind and solar ray has attracted attention. Further, a technology called a smart grid (next generation grid) also has attracted attention as a technology for stabilizing the grid, the smart grid operating a grid for connection, for example, in a mesh manner between a power plant and customers efficiently using IT (Information Technology).

In the grid, there may be an accident in the grid due to, for example, unbalance between the demands and supply of power. To previously prevent a power failure due to the accident in the grid, a battery system is used which includes battery packs each including single cells or assembled batteries connected in series. Out of such battery systems, there may be a battery system capable of outputting a power of a mega-watt class by combining a plurality of battery packs as a battery pack group, in which case, each of the battery packs should be supervised. Regarding the method of supervision, JP 06-283210 A discloses a mechanism for disconnecting one of battery packs having an error is disconnected from the body of the battery packs.

JP 06.283210 A discloses disconnection of the battery pack having an accident from the battery pack group by detecting an error state.

An aspect of the present invention provides a battery system comprising:

a plurality of battery packs connected in parallel each including a switch and a battery connected to the switch in series;

a battery state determining unit determining a state of the battery; wherein the battery state determining unit including:

a disconnection determining unit controlling disconnection of the switch and a switch controller controlling open and close of the switch in accordance with a result of determining the state, wherein the disconnection determining unit calculates allowable stop period and demanded stop period of the battery packs on the basis of the past time-base data of charging and discharging, season data, and allowable currents of the battery and transmits data to the switch controller when the demanded stop period is smaller than the allowable stop period, and the switch controller makes the switch in an open state.

DETAILED DESCRIPTION OF THE INVENTION

Prior to describing embodiments of the present invention, the above-mentioned related prior art is further argued.

As charging and discharging of the battery have been repeated, an estimation error in SOC (state of charge of battery) increases. To avoid the drawback, a method of re-estimating the SOC is effective by turning off the current flowing through the battery pack for a predetermined period. Further, when lead batteries and the nickel-hydrogen secondary batteries are used, it is necessary to periodically perform balancing among serially connected batteries (voltage equalization). JP06-283210 A discloses the disconnecting mechanism, but there is no description about a periodical diagnosis such as SOC re-estimation, etc.

Regarding periodical diagnosis, it is most efficient to perform the diagnosis while the battery pack as a diagnosis target is partially disconnected from the body of the battery packs. However, even though this method is adopted, there is still a problem in that an additional battery capacity is required in addition to the battery capacity originally required.

The present invention provides, for a battery pack group including secondary batteries, a battery system for performing a diagnosis of battery pack groups as need arises without increase in the battery capacity.

To solve the above-described problem, the battery control device of the present invention has technical features as follows:

(1) The battery pack groups includes units for measuring a current voltage, a temperature of the battery pack, a disconnection determining unit storing data of past time-base power data and past demanded stop period of determining disconnection of the battery pack and determining disconnection of the battery pack, and a switch controller instructing the switch for the battery pack to open and close the switch.

(2) When a power demanded for the battery pack group is smaller than a power of the battery pack when the battery pack is disconnected, and it is determined from past time-base data of power that the state continues over the demanded stop period of the battery pack, the switch of the battery pack is turned off.

Advantageous Effect

According to the present invention, there is provided a battery system periodically carrying out diagnosis of batteries.

First Embodiment

Figure 1:
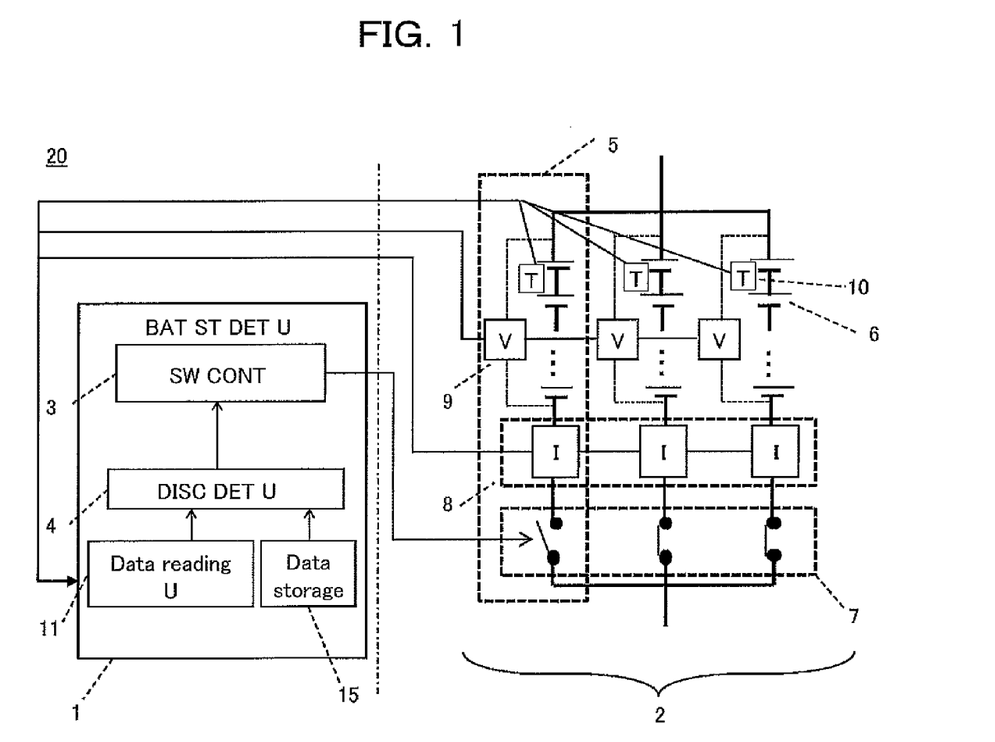
FIG. 1 is a block diagram of a battery system.

Hereinafter, a first embodiment of the present invention is described with reference to drawings. FIG. 1 shows a block diagram of a battery system 20. The battery system 20 includes a battery state determining unit (BAT ST DET U) 1 and a battery pack group 2. The battery state determining unit 1 includes a switch controller (SW CONT) 3, and a disconnection determining unit 4. Although not shown in FIG. 1, the disconnection determining unit 4 communicates with an upper system. The battery pack group 2 includes a plurality of battery packs 5 connected in parallel.

Although not shown in FIG. 1, power is interchangeable between the battery pack group 2 and the upper system. Each of the battery packs 5 includes a plurality of batteries 6, a switch 7, a current measuring unit 8 (I), a cell voltage detecting unit 9 (V), and a temperature measuring unit 10 (T). In the battery pack 5, a plurality of the batteries 6 are connected in series. For the battery 6 forming the battery pack 5, a lithium ion battery, nickel-hydrogen secondary battery, a lead battery, etc. are usable.

The battery pack group is configured including: battery packs connected in parallel, each including lithium ion batteries; battery packs connected in parallel, each including only lead batteries; or battery packs connected in parallel, or the battery pack group may be a combination of different types of battery packs connected in parallel. The current measuring unit 8 measures a current flowing through the battery packs with a shunt resistor, a hall element, etc. The temperature measuring unit 10 measures a temperature inside the battery pack 5 with a thermistor or a thermal couple. There may be a case where a plurality of thermistors or thermocouples may be used in combination as necessary. Information of the currents, the voltages, and the temperatures are sent to the disconnection determining unit 4.

Figure 2:
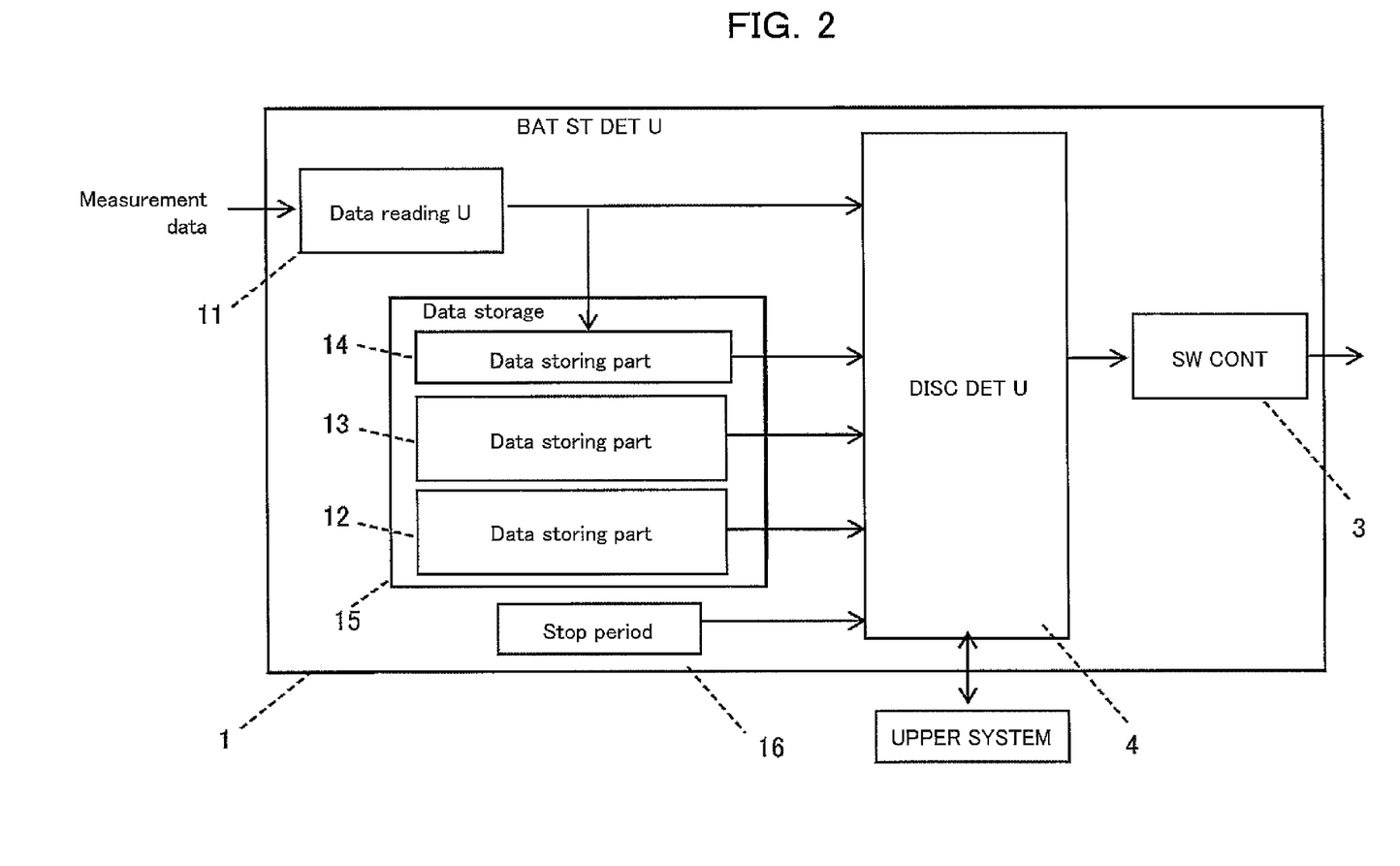
FIG. 2 is a block diagram of a battery state determining unit which is shown in FIG. 1 and includes a disconnection determining unit.

Configuration of the battery state determining unit 1 is shown in FIG. 2 in detail. The battery state determining unit 1 includes a battery measurement data reading unit (Data reading U) 11 for reading data of the measured temperatures, currents, voltages, a data storing part 12 for storing data regarding variation in power in accordance with seasons, etc, a data unit storing part 13 for storing data regarding battery allowable current, a data storing part 14 for storing past measurement data, the disconnection determining unit 4 for determining whether a battery pack is to be disconnected, a demanded stop period 16, and the switch controller 3 for instructing the switch 7 on the basis of the command from the disconnection determining unit 4. The current season may be determined by, for example, the current date set in a clock installed in the battery system 20.

The battery measurement data reading unit 11 reads data of the currents, voltages, and temperatures measured by the measuring units and transmits the data to the disconnection determining unit 4 and the data storing part 14. The data storing part 12 for storing power data varying in accordance with seasons and the data storing part 13 for storing data regarding battery allowable current are rewritable on the basis of the previously made data as needed.

Figure 3:
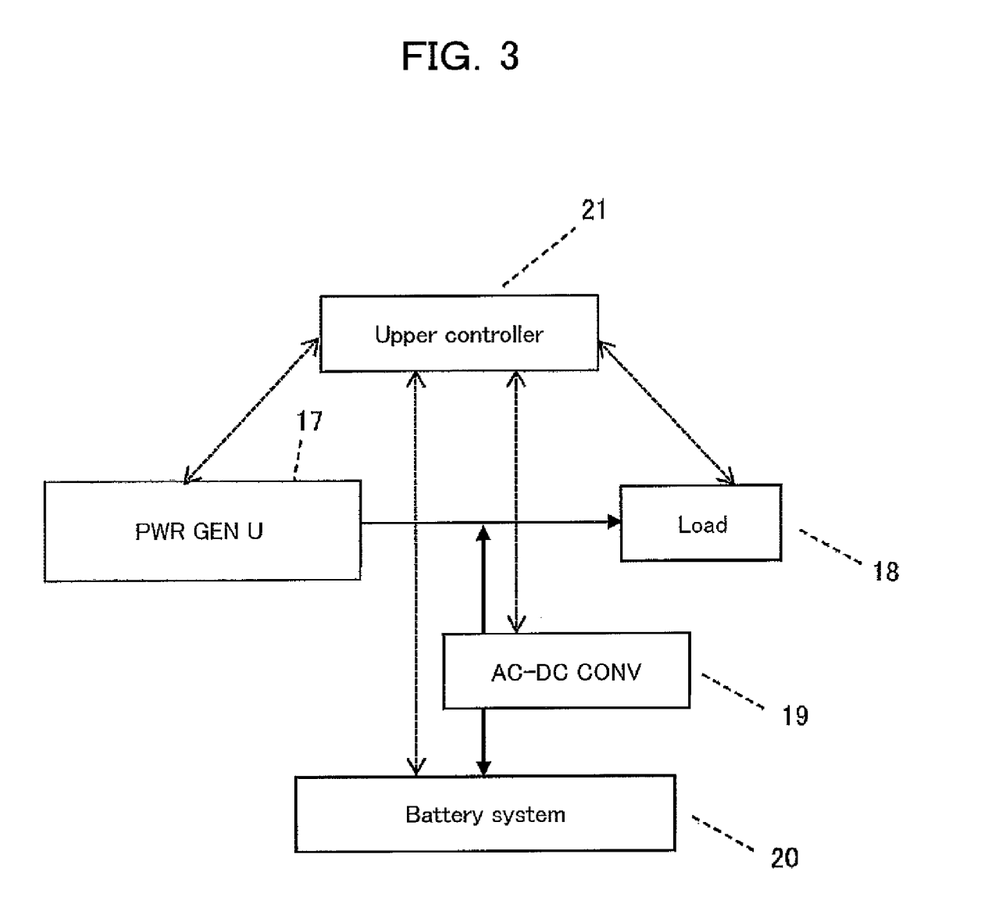
FIG. 3 is a block diagram of an energy system using the battery system according to the present invention.

FIG. 3 shows an energy system using the battery system. The energy system includes a power generating unit 17 such as solar power generation and a wind power generation, etc., a load 18, an AC-DC converter 19, the battery system 20, and an upper controller 21. The battery system 20 shown in FIG. 1 corresponds to the battery system 20 in FIG. 3. The power generating unit 17 for the wind power generation or the solar power generation may be a plurality of power generating units. Further, the load 18 is a load which may be a device consuming power such as home use power or a load for storing power such as batteries. A power converter may be added before the load 18 as necessary. The power generated by the power generating unit 17 is transmitted to the load 18. Since the energy such as the solar ray power and the wind power is unstable, there are many cases where the generated power does not agree with the power requested by the load. To solve the problem, the power generating unit 17 is connected to the battery system 20 having a function of getting balance between the power of the power generating unit 17 and the load, etc. through the AC-DC converter 19. The upper controller 21 monitors interchanging of power therebetween and sends commands to each of units and has a function of reading data measured by respective measuring units.

Hereinafter, a method of disconnecting the battery pack 5 from the battery pack group 2 is generally described with reference to FIGS. 4 to 6. A case where the solar power generation is adopted for the power generating unit 17 is exemplified. However, other power generation method such as a wind power generation, etc. can be usable.

Figure 4:
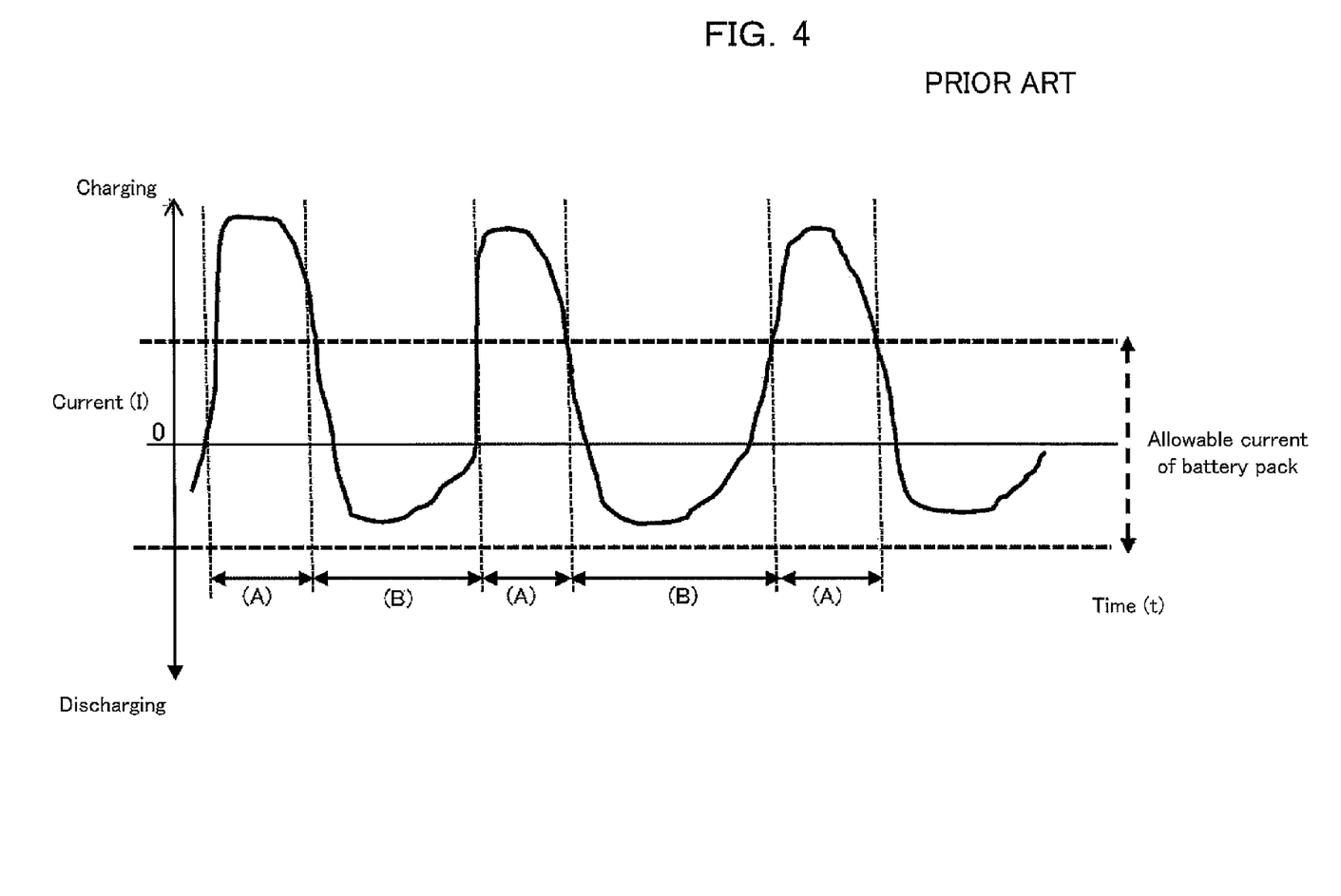
FIG. 4 is a chart of a prior art example of a current pattern of battery pack group.

FIG. 4 shows an example of a current waveform (corresponding to data for three days) required for the battery in accordance with power demand supply balance between the load 18 side and the power generating unit 17 side in the case where the solar power generation is adopted for the power generating unit 17. In this chart, the abscissa indicates time and the coordinate indicates a current intensity. An upward direction in this chart is a direction of charging. The waveform includes parts (A) having a large charging and discharging current and parts (B) having a smaller charging and discharging current. The parts (A) correspond to day periods while a power generated by the solar ray is stored in the batteries. The parts (B) correspond to night periods while the load side consumes the power which has been stored.

In the embodiment, an example is shown in which the load is connected as an energy system, but another example may be applicable in which a grid of a power plant company is connected instead of the load. In that case, when the power generated by solar light is larger than the power demanded by the load, which allow the system to transmits the power to the grid.

As the battery system has been experienced charging and discharging repeatedly, an error in an SOC (state of charge of the battery) increases. This is because a method of calculating the SOC adopts accumulating a current in addition to the initial SOC, and the current accumulated includes an error.

Figure 5:
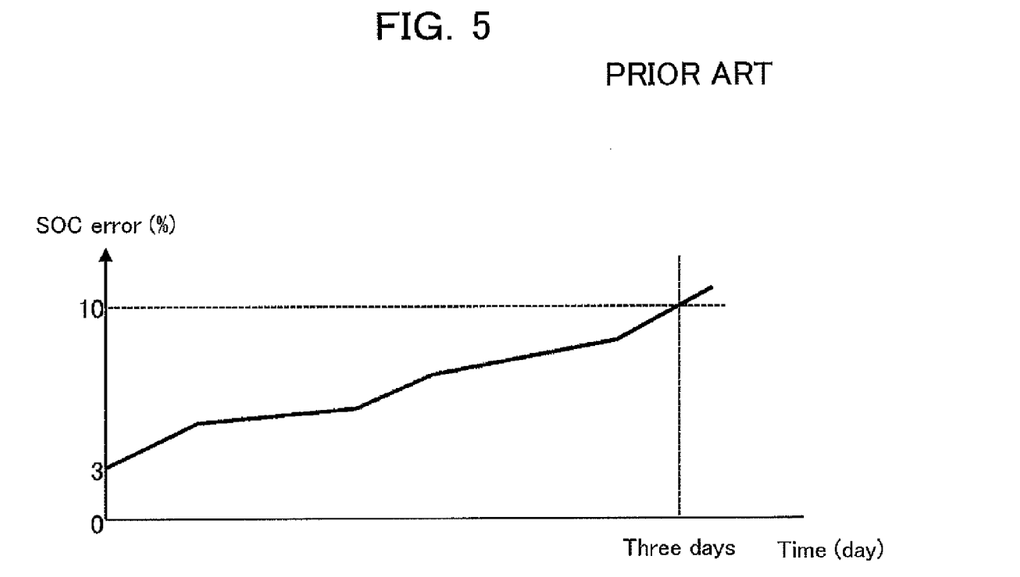
FIG. 5 is a chart showing time variation in an SOC error in prior art.

FIG. 5 shows an example of time variation of the SOC error. For example, when it is defined that an allowable error of the SOC is not greater than 10%, it is understood that after ten days, the error exceeds the allowable error. Accordingly, when ten days have passed, it is necessary to estimate the SOC again.

A voltage of the battery is a voltage between terminals of the battery and measured as a voltage which is calculated by adding a voltage caused by resistance×current to an open circuit voltage. Out of them, the SOC can be estimated from the open circuit voltage at a low error. However, it becomes very difficult to estimate the resistance because the resistance includes a plurality of elements (for example, polarization or solution resistance, etc.), so that it is hard to estimate (voltage caused by (resistance×current)). Here, when the current is zero, this can make the (voltage caused by (resistance×current)) zero, so that the voltage measured between terminals of the battery includes only the (open circuit voltage), which can make it easy to estimate the SOC. This can be provided by disconnecting the battery from the body of the system to provide a state in which no current flows for a predetermined period.

In FIG. 4, at the part (B) in FIG. 4, a state in which a low current flows through a current system may continue for a period at a regular interval. Accordingly, it can be made possible to provide a state in which no current flows by disconnecting from the body of the system the battery pack of which SOC is to be initialized in phase with the period of the low current state with the period being targeted.

Figure 6:
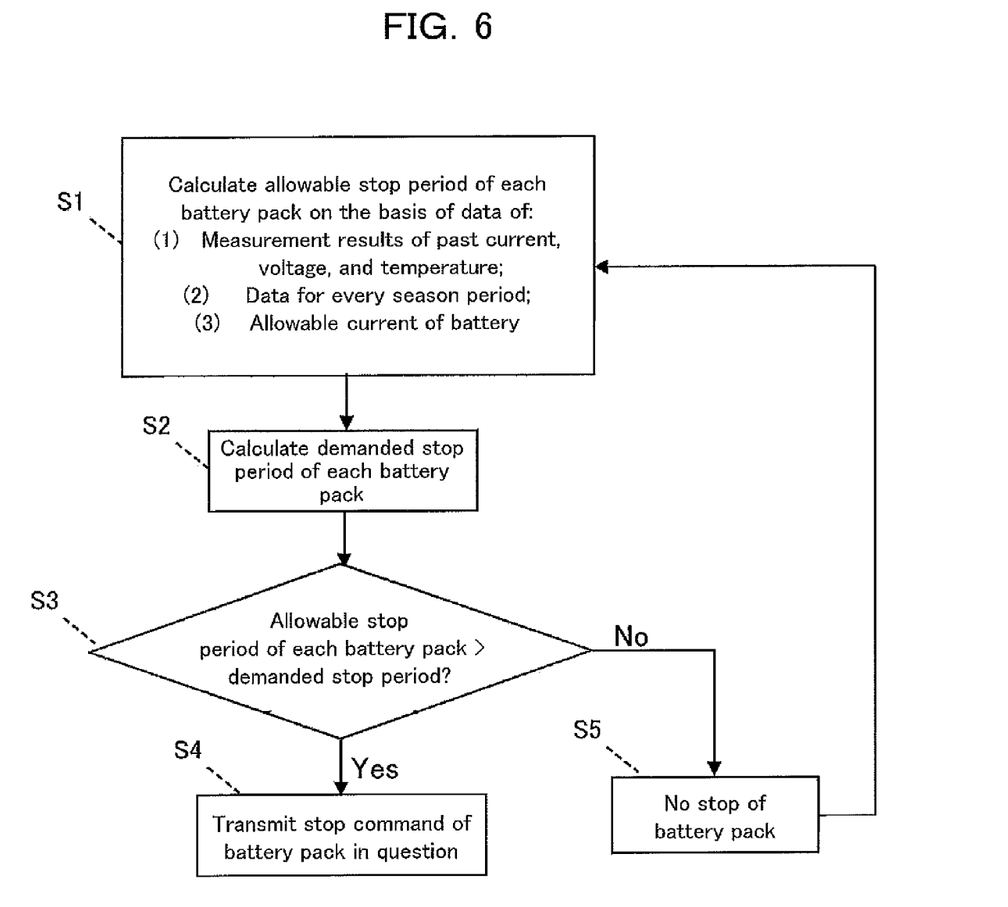
FIG. 6 is a flowchart of operation of the battery system according to the present invention.

A more specific flowchart is shown in FIG. 6. First, in a step S1, the disconnection determining unit (DISC DET U) 4 calculates a battery pack allowable stop period on the basis of the past data, season data, an allowable current of the battery, etc. In the embodiment, the period of (B) in FIG. 4 corresponds to the allowable stop period. Subsequently, in a step S2, the disconnection determining unit 4 calculates demanded stop period of each battery pack from a period necessary for the SOC initialization. In a step S3, the demanded stop period of each battery pack is compared with the allowable stop period. When the demanded stop period of each battery pack is greater than the allowable stop period, processing proceeds to a step S4 where the switch controller 3 outputs a command of disconnecting the battery pack (stop command) and opens the switch 7 for the demanded period. On the other hand, the demanded stop period of each battery pack is compared with the allowable stop period. When the demanded stop period of each battery pack is smaller than the allowable stop period, processing proceeds to a step S5 where the battery pack is not disconnected and the processing returns to the step S1 to repeat the process.

Figure 7:
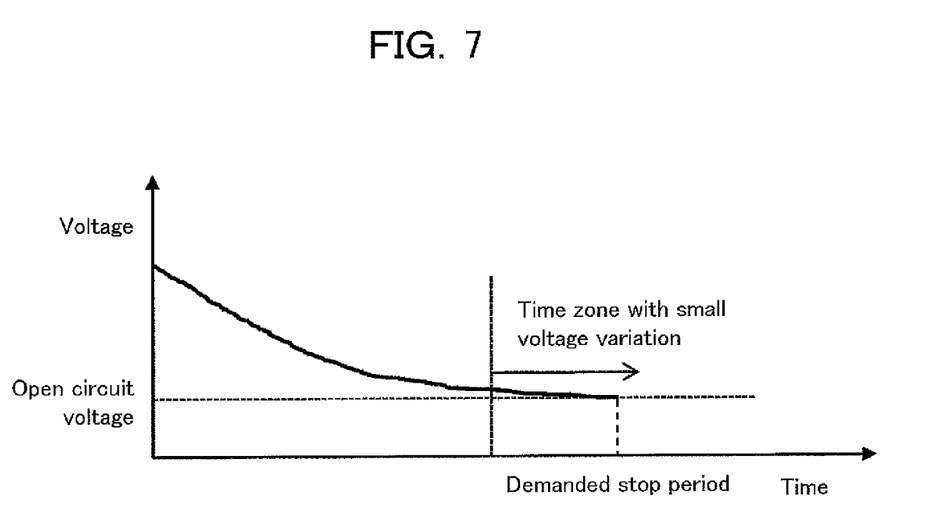
FIG. 7 is a chart of battery voltage variation when a charging current is turned off.

FIG. 7 shows a behavior of the battery being in the stop period. In the behavior, a part of the behavior curve in which the voltage variation becomes small is regarded to be the open circuit voltage of the battery. If an example of the period in which the voltage variation becomes small is, for example, one hour. More specifically, the demanded stop period for the battery pack is set to be longer than the period in which the voltage variation becomes sufficiently small. The SOC is estimated again from the open circuit voltage to make the SOC error small.

The battery pack once disconnected is caused to be connected again in a most preferable state at such a suitable timing that the connection is made in the most preferable state in accordance with the voltage variation and the current variation of the battery pack. The most preferable timing defined here can be determined in accordance with, for example, in a state in which a voltage of the other battery pack connected in parallel is the same or substantially the same (for example, the voltage error is not greater than 5%). In addition, it is possible that the disconnection determining unit 4 can determine whether re-connection is allowed.

Figure 8:
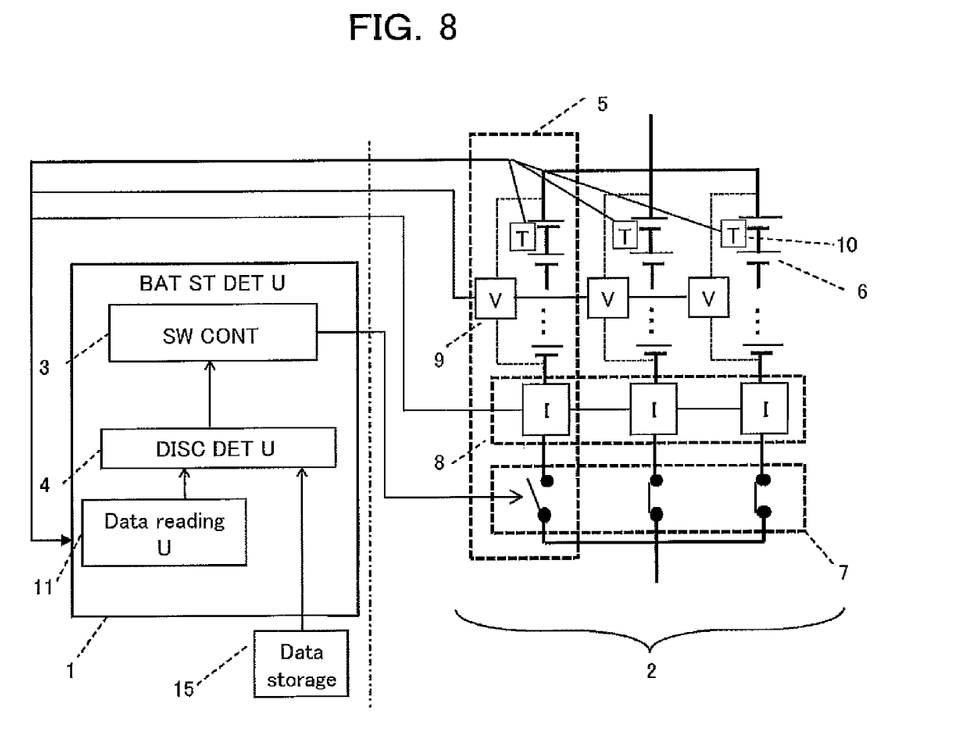
FIG. 8 is a block diagram of a modification of the first embodiment.

Subsequently, a modification of the first embodiment is described. FIG. 8 shows the modification. In the first embodiment described above, the data storage 15 is included in the battery state determining unit 1. However, as shown in FIG. 8, it is possible that the data storing unit is made independent as an external device.

As described above, the configuration according to the first embodiment provides periodical diagnoses of the battery under 24-hour operation condition without increase in the number of the batteries.

Second Embodiment

Next a second embodiment is described hereinafter. In the second embodiment, the nickel-hydrogen secondary battery and lead batteries are used and there is a difference from the first embedment in that a specific control inherent to the nickel-hydrogen secondary battery and the lead battery is added.

In the second embodiment, the battery pack 5 includes nickel-hydrogen secondary batteries or the lead batteries forming the battery group of the battery system shown in FIG. 1. In the case where the lead batteries or the nickel-hydrogen secondary batteries are used, when the voltage exceeds a predetermined threshold voltage, there is a phenomenon in which the batteries are not charged anymore and a fully charged state continues. Utilizing this phenomenon, a method of re-estimating the SOC can be provided by making the nickel-hydrogen secondary battery or lead battery which was disconnected from the battery system in the fully charged state by connecting a charging device to the nickel-hydrogen secondary battery or the lead battery. Further, a method of connecting the lead battery and nickel-hydrogen secondary battery only when the battery pack group is demanded to be charged may be adopted.

Figure 9:
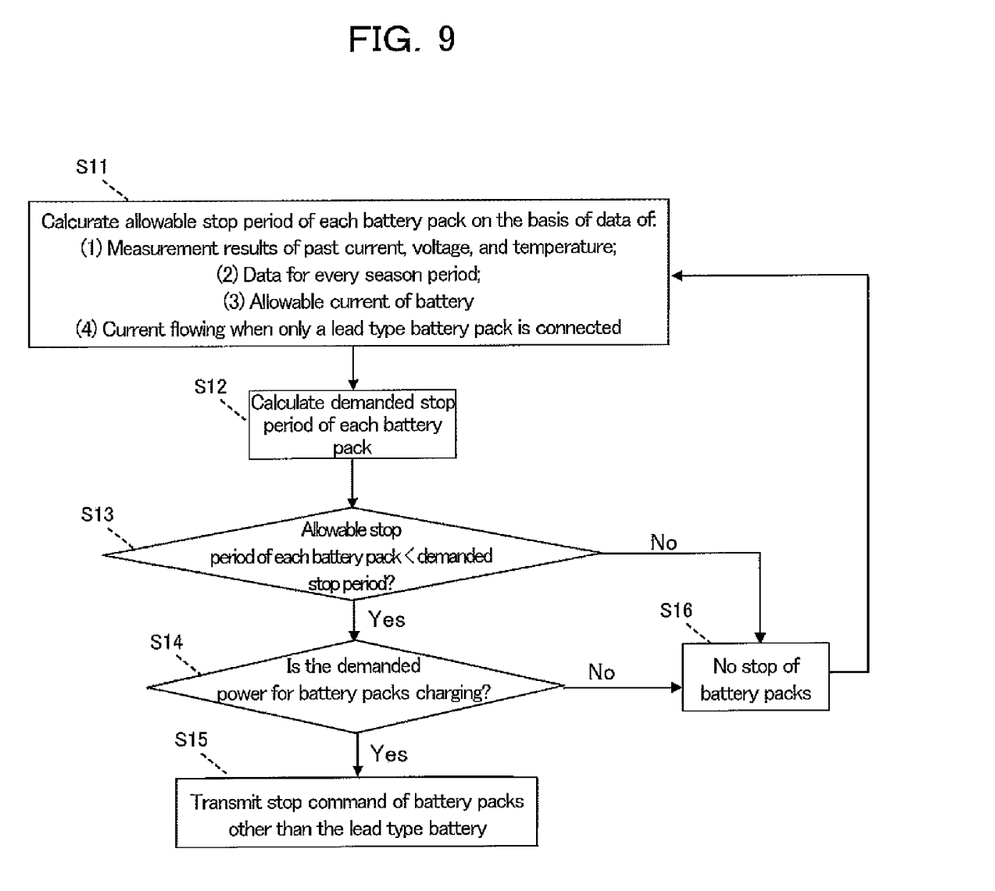
FIG. 9 is a flowchart of the battery system according to a second embodiment of the present invention.

FIG. 9 shows this flowchart. In a step S11, in addition to the (1) to (3), data used in the first embodiment, a current flowing in the case where the only the lead battery is connected is calculated to provide the allowable stop period for only the lead batteries on the basis of the data. Subsequently, the demanded stoop period of each battery pack is calculated in a step S12. Next, it is determined in a step S13 whether the allowable stop period is smaller than the demanded stop period. When the allowable stop period is not smaller than the demanded stop period, processing proceeds to a step S16 where processing is returned to the step S11 and repeats the process without disconnection of the battery pack. On the other hand, when the allowable stop period is smaller than the demanded stop period, processing proceed to a step S15 where it is determined whether the demanded power to the battery pack is in the charging direction or the discharging direction. When the demanded power to the battery pack is in the discharging direction, processing proceed to a step S16 and returns to the step S11 and repeats the processing without disconnecting the battery pack. On the other hand when the demanded power to the battery pack is in the charging direction, processing proceed to the step S15 where the connection to the battery pack other than the lead battery is turned off. This method can make the battery pack including the lead batteries in the fully charged state, so that the SOC can be accurately calculated in the state of the fully charged of the lead battery. In addition using this method, a refresh charging can be provided for balancing between serially connected cells or to have a loner life time.

Third Embodiment

Next a third embodiment is described. The third embodiment is different from the first embodiment in that an operating time measuring unit 34 for measuring operating time is newly added between the switch controller 3 and the disconnection determining unit 4 of the battery system shown in FIG. 1. In addition, the same or similar configuration parts other than the above described configuration are designated with the same or corresponding reference numeral and the duplicated descriptions are omitted.

Figure 10:
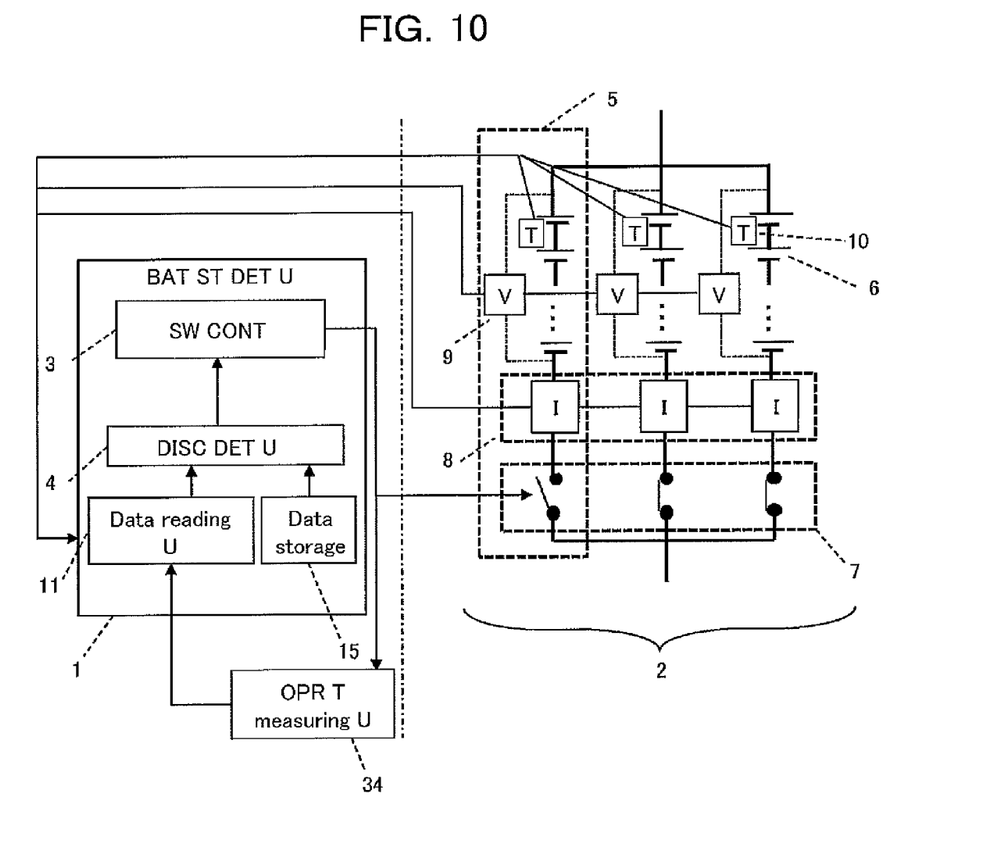
FIG. 10 is a block diagram of the battery system according to a third embodiment.

FIG. 10 shows a battery system according to the third embodiment. The operating time measuring unit 34 for measuring the operating time of the battery pack transmits data regarding the operating time of the battery packs to the battery measurement data reading unit 11 which transmits the data to the disconnection determining unit 4.

Figure 11:
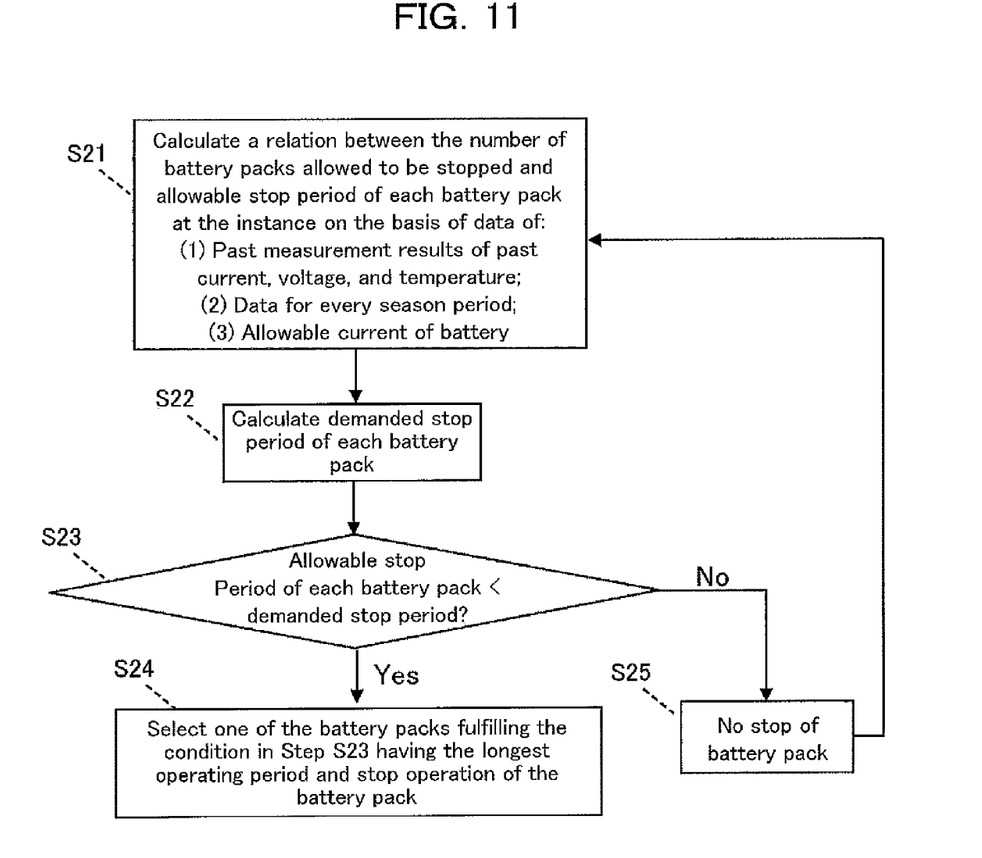
FIG. 11 is a flowchart illustrating operation of the battery system according to the third embodiment of the present invention.

FIG. 11 shows a flowchart using the operating time measuring unit 34. First, in a step S21, a relation between the number of the battery packs of which operation is allowed to stop and the allowable stop period of the battery pack at the instance is calculated on the basis of the data (1) to (3) used in the first embodiment. In a step S22, the demanded stop period of each battery packs is calculated. Subsequently, processing proceeds to a step S23 where it is determined whether there is a battery pack meeting a condition of an allowable stop period<a demanded stop period. When there is no battery pack meeting the condition of the allowable stop period<demanded stop period, processing proceeds to a step S25 where the battery pack is not disconnected and returns to the step S21 to repeat the processing.

On the other hand, when there are more than one battery pack meeting the condition of the allowable stop period<the demanded stop period, processing proceeds to a step S24 where the battery pack having a long operation time is stopped preferentially. The battery pack having a long operation time is stopped preferentially, which provides the re-estimation of the SOC of the battery pack of which error becomes large. Accordingly, this improves the method of estimating the SOC of the battery pack having a larger error, so that a reliability of the whole of the battery system can be increased.

In the third embodiment, out of the battery packs meeting the condition of the allowable stop period<the demanded stop period, the battery pack having the longer operating time is selected, it is also allowed that the battery pack including the lead batteries is always selected preferentially, and out of the lead batteries the battery pack including the lead batteries having the longer operating time is selected to be stopped.

Fourth Embodiment

Subsequently, a fourth embodiment is described. The fourth embodiment is different from the first embodiment in that the disconnecting control is made in a case where the battery pack meets a predetermined condition even if the allowable stop period is shorter than the demanded stop period.

Figure 12:
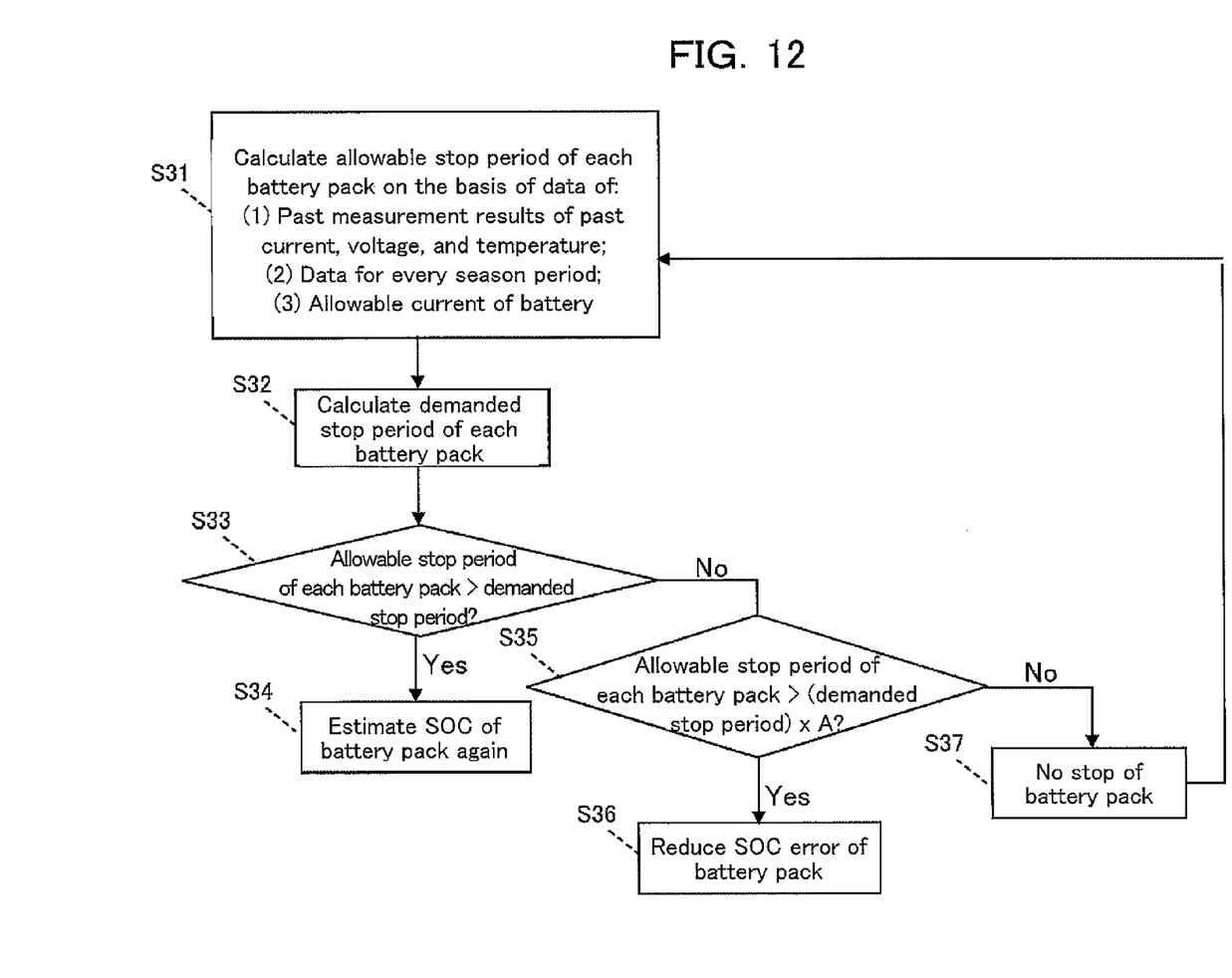
FIG. 12 is a block diagram of the battery system according to a fourth embodiment.

FIG. 12 is a flowchart up to the operation stop of the battery pack. First, the allowable stop period of each battery pack is calculated in a step S31 on the basis of the data (1) to (3) used in the first embodiment. Subsequently, the demanded stop period of each battery pack is calculated in a step S32. After that, processing proceeds to a step S33, it is determined whether the allowable stop period of each battery pack>the demanded stop period. When the condition of "the allowable stop period>the demanded stop period" is met, processing proceeds to a step S34.

On the other hand, when the allowable stop period<the demanded stop period, processing proceeds to a step S35 where it is determined whether "the allowable stop period>the demanded stop period×A (when A is 1, the demanded stop period is one hour)" is met. When the condition of "the allowable stop period>the demanded stop period" is fulfilled, processing proceeds to step S36 where a control of reducing the SOC error of the battery pack is made. The value of A is a value determining where a time period having a small voltage variation is sectioned. Accordingly, when it is assumed that the time period having small voltage variation is one hour (i.e., the demanded stop period is one hour) and the value of A is determined to be ½. The control for reducing the SOC error has the demanded stop period of 30 minutes. After that, the SOC is calculated again. According to the control described above, there is provided an advantageous merit of rapid re-estimating the SOC though the voltage variation is not perfectly suppressed, so that an error due to polarization is superimposed on the voltage. On the other hand, when the condition of "the allowable stop period>the demanded stop period×A" is not met, processing proceeds to a step S37 where processing does not disconnect the battery pack and returns to the step S31 to repeat the process.

Figure 14:
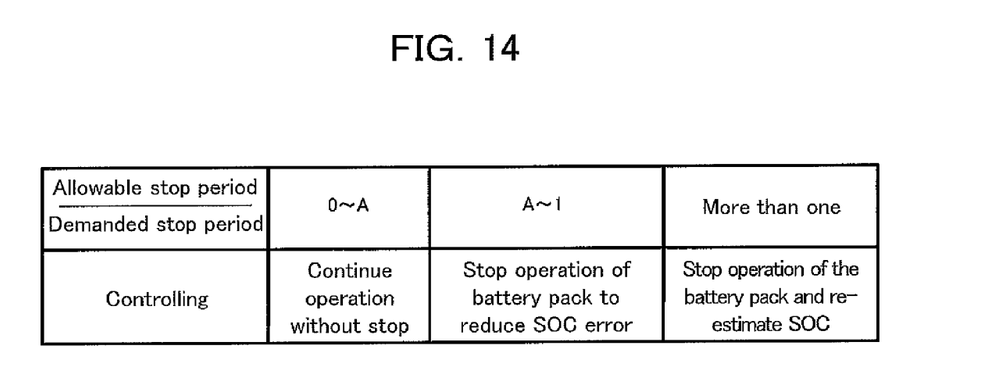
FIG. 14 is a table indicating permission and inhibition of disconnecting a battery pack in accordance with a ratio between the demanded stop period and allowable stop period according to the fourth embodiment.

"A" is a constant equal to or smaller than 1 determined in accordance with a capacity of the battery, a size of the battery, etc. For example, "A" can be calculated from a voltage variation. In the fourth embodiment, content of the control is changed. FIG. 14 shows an embodiment in which the content of the control is changed in accordance with a difference in the value of "A".

Figure 13:
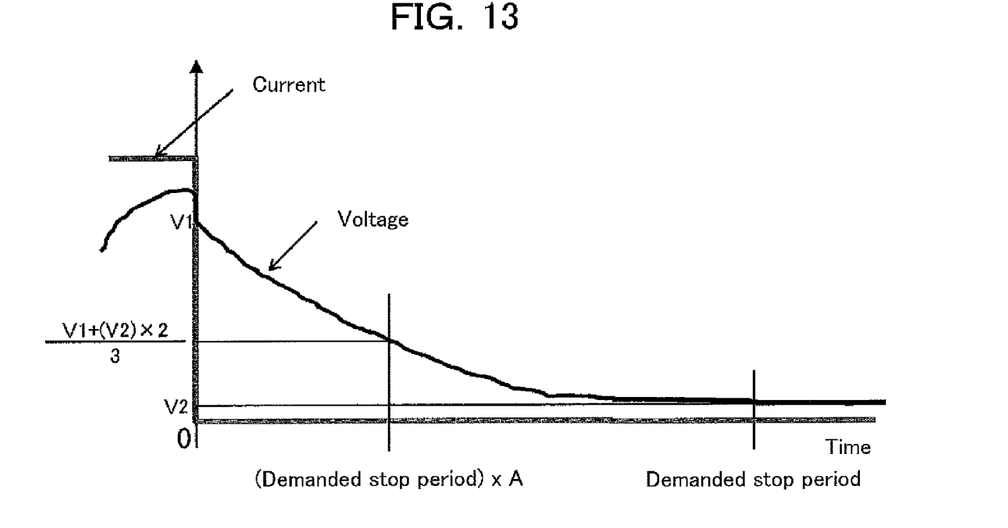
FIG. 13 is a chart of battery voltage variation when a charging current is turned off in the fourth embodiment.

FIG. 13 is a chart showing a result of voltage variation when a charging current flowing through the battery is turned off. In the chart, the current is turned off at an origin of the chart. The demanded stop period is determined on the basis of time when the voltage becomes substantially constant. On the other hand, "demanded stop period×A" is defined as time when the voltage reaches a point $((V1+2\times V2)/3)$ which is intermediate between the voltage (V1) when the current is turned off and a constant voltage (V2). However, any value other than $((V1+2\times V2)/3)$ is allowable, as long as the intermediate point is calculated on the basis of V1 and V2.

When demanded stop period×A" is met, the battery pack is disconnected from the battery pack to stop operation for "demanded stop period×A". The SOC is calculated by estimating the open circuit voltage of the battery from the voltage drop measurement result when the operation is stopped. The SOC error at this instance is estimated and stored in the data storing part 14 for storing past measurement data. This operation does not provide re-estimation of the SOC, but can reduce the SOC error.

The present invention is summarized as follows:

In the battery system according to the present invention, a plurality of the battery packs 5, each including a battery and a switch connected in series with the switch 7, are connected in series. The battery system includes the battery state determining unit 1 which includes the disconnection determining unit 4 and the switch controller 3. The disconnection determining unit 4 calculates the allowable stop period and the demanded stop period on the basis of the past data, the season data, and the allowable current of the battery. When the demanded stop period is shorter than the allowable stop period, the disconnection determining unit 4 transmits the data to the switch controller 3. The switch controller 3 turns off the switch 7 to make the states in open state. As described above, the battery pack 5 is opened only when the charging current of the battery 6 is small by calculating the allowable stop period of the battery pack 5 on the basis of the past data, the season data, and allowable current of the battery. Accordingly, without an additional installation of the battery packs, it is possible to set the SOC again periodically.

The battery system according to the present invention, the disconnection determining unit 4 obtains the operation time data of each of the battery packs 5 from the operating time measuring unit 34 for measuring the operating time of the battery pack 5. When there are a plurality of battery packs of which the demanded stop period is shorter than the allowable stop period, the disconnection determining unit 4 transmits a command of disconnecting the battery pack 5 having a long demanded stop period to the switch controller 3. According to this operation, it becomes possible to disconnect preferentially the battery pack 5 of which the SOC error becomes large due to a long operation time.

Accordingly, the error in estimating the SOC is made smaller as the whole of the battery system, so that the reliability can be improved. Further, in the battery system of the present invention, the disconnection determining unit 4 transmits data to the switch controller 3 when demanded stop period×A" (A is not greater than 1) is met in the case where the demanded stop period is longer than the allowed stop period. As a result, the switch controller 3 makes the switch 7 open for demanded stop period×A". According to the configuration, though an error in the voltage for estimating the SOC remains to some extent, a rapid estimation of the SOC can be provided.

As the embodiments of the present invention have been described above, the present invention is not limited to the embodiments described above, but may be modified without departure of the spirit of the present invention defined in the claims of the present application. For example, the embodiments described above have been described in detail to provide easily-understandable descriptions for the present invention, but not limited to the configuration including all elements described above. Further, a part of configuration of one embodiment can be replaced with a part of configuration of another embodiment, and a part of the configuration of another embodiment can be added to the configuration of the embodiment. Further, a part of the configuration of each of the embodiments can be added to, omitted, and replaced with another configuration.

The invention claimed is:

1. A battery system comprising:
    a plurality of battery packs connected in parallel and each including a switch and one or more batteries connected to the switch in series;
    a battery state determining unit configured to determine a state of the battery packs,
    wherein the battery state determining unit includes:
    a disconnection determining unit configured to control disconnection of the switch of each of the battery packs and a switch controller configured to control opening and closing of the switch of each of the battery packs in accordance with a result of the determined state of the battery packs,
    wherein the disconnection determining unit is further configured to:
    calculate an allowable stop period of one of the battery packs, which is how long the one of the battery packs can be disconnected from a load, based on past measured data of the battery packs, season data and allowable currents of the batteries, calculate a demanded stop period of the one of the battery packs, which is how long the one of the battery packs needs to be disconnected for an SOC (state of charge) check, based on past charging and discharging data of the batteries, and, when the demanded stop period is smaller than the allowable stop period, make the switch controller cause the switch of the one of the battery packs to be in an open state.

2. The battery system as claimed in claim 1, further comprising:
    an operating time measuring unit configured to measure an operating time of the battery packs,
    wherein the disconnection determining unit is further configured to obtain an operating period data of each of the battery packs from the operating time measuring unit, and, when two or more of battery packs have demanded stop periods which are shorter than the allowable stop period, transmit a disconnection command for disconnecting the one of the battery packs having a longest operating period among the two or more battery packs.

3. The battery system as claimed in claim 1, wherein the disconnection determining unit is further configured to:
    when the allowable stop period is greater than the demanded stop period multiplied against a factor A (A being equal to or smaller than one) transmit data to the switch controller to make the switch controller cause the switch of the one of the battery packs to be in the open state for a period of time equal to the demanded stop period multiplied by A.

4. The battery system as claimed in claim 2, wherein the disconnection determining unit is further configured to:
    when the allowable stop period is greater than the demanded stop period multiplied against a factor A (A being equal to or smaller than one), transmit data to the switch controller to make the switch controller cause the switch of the one of the battery packs to be in the open state for
    a period of time equal to the demanded stop period multiplied by A.

* * * * *